US00RE33917E

United States Patent [19]

Lapeyre, deceased et al.

[11] E Patent Number: Re. 33,917

[45] Reissued Date of Patent: May 5, 1992

[54] SUPPORT APPARATUS FOR USE IN VIDEO IMAGING AND PROCESSING OF TRANSVERSE FISH SECTIONS

[75] Inventors: James M. Lapeyre, deceased, late of New Orleans, La., by Noreen B. Lapeyre, administratrix; John P. Farrell, South Jordan, Utah; Ronald H. Burch, Harahan, La.; Mark E. Sutton, Kenner, La.; Joseph F. Scamardo, Jr., Metairie, La.

[73] Assignee: The Laitram Corporation, Harahan, La.

[21] Appl. No.: 714,209

[22] Filed: Jun. 12, 1991

Related U.S. Patent Documents

Reissue of:

[64] Patent No.: 4,847,954
Issued: Jul. 18, 1989
Appl. No.: 202,696
Filed: Jun. 3, 1988

U.S. Applications:

[63] Continuation of Ser. No. 49,730, May 12, 1987, Pat. No. 4,748,724.

[51] Int. Cl.[5] ..... A22C 25/06; A22C 25/14

[52] U.S. Cl. ..... 452/158; 452/157; 83/177

[58] Field of Search ..... 452/157, 158, 156, 155, 452/161; 83/177, 363, 365, 368, 371, 72, 53, 435, 435.1, 437, 425.3

[56] References Cited

U.S. PATENT DOCUMENTS

| | | | |
|---|---|---|---|
| 3,089,775 | 5/1963 | Lindall | 452/140 |
| 3,800,363 | 4/1974 | Lapeyre | 452/158 |
| 3,978,748 | 9/1976 | Leslie et al. | 83/53 |
| 4,020,528 | 5/1977 | Lindbladh et al. | 452/158 |
| 4,217,679 | 8/1980 | Gordan | 452/158 |
| 4,520,702 | 6/1985 | Davis et al. | 83/371 X |
| 4,651,479 | 3/1987 | Marx | 83/177 X |
| 4,669,229 | 6/1987 | Ehlbeck | 83/177 X |
| 4,962,568 | 10/1990 | Rudy et al. | 452/157 |

FOREIGN PATENT DOCUMENTS

| | | | |
|---|---|---|---|
| 141833 | 10/1930 | Switzerland | 83/425.3 |

*Primary Examiner*—Willis Little
*Attorney, Agent, or Firm*—Pravel, Gambrell, Hewitt, Kimball & Krieger

[57] ABSTRACT

A processing apparatus for use in the processing of transverse fish body sections includes a support frame and a video camera for providing a video image of a transverse fish body section to be processed when aimed at the fish body section along a preselected line of sight. A fish section support is provided for supporting the transverse fish section substantially over its area. The support can be invisible on the video photo image and preferably includes a plurality of spaced apart beams which are of a small dimensional width so that they do not appear on the video photo image that contains the fish body sections. A fluid jetting knife is movable with respect to the transverse fish body section for cutting the section with a pressurized fluid stream and positioned to traverse both the fish section and the support means during the cutting operation.

20 Claims, 2 Drawing Sheets

SUPPORT APPARATUS FOR USE IN VIDEO IMAGING AND PROCESSING OF TRANSVERSE FISH SECTIONS

Matter enclosed in heavy brackets [ ] appears in the original patent but forms no part of this reissue specification; matter printed in italics indicates the additions made by reissue.

This application is a continuation of application Ser. No. 049,730 filed May 12, 1987 which issued as U.S. Pat. No. 4,748,724 issued Jun. 6, 1988.

BACKGROUND OF THE INVENTION

The present invention relates to fish processing and more particularly to an improved method and apparatus for processing transverse fish body sections wherein a high intensity water jet knife traverses the fish section using computer generated position information obtained from video imaging such as a video camera, and wherein a support matrix such as a multiplicity of knife blade beams supports the fish section during high intensity water jet cutting. The beam system can have a sufficiently small cross-section normal to the line of sight so that it does not interfere with imaging of the fish section. Alternately, a darkened beam support can be used which reflects little or no light and is thus "invisible" to the video camera.

In the processing of fish such as tuna, it is common to freeze a catch of fish at sea, and to process the catch on shore. The processing normally involves manual operations of slicing the fish belly and the removal of viscera. The visceral cavity is then washed with water, and the tuna inspected for spoilage. The tuna is then usually cooked whole in a batch type procooking operation.

Manual prior art methods of processing tuna are described in greater detail in U.S. Pat. No. 3,594,191 issued to J. M. Lapeyre. That patent discloses cutting the tuna in lateral sections at spaced intervals and thereafter separating the edible loin portions to provide discrete cannable portions. A later U.S. Pat. No. 3,593,370 entitled "Method of Butchering Tuna" issued to J. M. Lapeyre, describes a process for processing such transverse tuna sections while frozen. The method of butchering frozen tuna included the subdivision of the whole fish into a plurality of transverse cross-sections and subsequently subdividing the cross-sections into frozen segments. The junctures between the sections were along lines generally parallel to the longitudinal axis of the fish and to the skeletal structure thereof. Each lateral fish section was skinned and the skinned sections were operated on to effect a separation of the scrap parts of the sections from the loin meat parts, while the latter were still in at least a partially frozen condition.

U.S. Pat. No. 3,800,363 issued to J. M. Lapeyre entitled "Tuna Butchering Method and System" describes an automated butchering method and system for separating the edible loin portions of transverse tuna slices provided by subdivision of a frozen whole tuna. Each transverse slice of the principal loin bearing section of a frozen tuna was scanned to produce electrical signals representative to the boundary between the edible loin portions and the contiguous waste meat portions. Control signals were then derived from the electrical signals for use in cutting for precise separation of the edible loin portions along the detected boundary. A photosensor array scanner was arranged to reflect light from the surface of a tuna slice and a provided light source. Electrical signals were provided by the sensor array of varying magnitude in accordance with the varying reflectivity of the slice surface being scanned. The electrical signals were processed by a threshold circuit which provided a threshold level above which signals were presumed to be representative of the lighter, edible loin portions and below which the signals were presumed to be representative of the relatively darker waste meat portions. The transformation of scanner output signals into control signals for the cutting apparatus was thought to be accomplished by a special purpose electronic controller or a suitably programmed computer to provide cutting control signals. Electrical output signals were also described as controlling operation of a cutting tool. The cutting apparatus for cutting the loin portions along predetermined boundaries was described as a high pressure water jet cutter which typically would operate at a pressure of about 30,000 to 75,000 psi and the water jet cutter was described as typically being mounted upon a movable head.

U.S. Pat. No. 4,738,004 also issued to J. M. Lapeyre has some similarity to the Lepeyre U.S. Pat. Nos. 3,593,370 and 3,800,363, but is primarily directed toward cooking or partial cooking of the transverse fish section prior to visual imaging so as to enhance the boundaries between the loin portions and blood-meat portions of the transverse fish section.

U.S. Pat. Nos. 3,594,191; 3,593,370; 3,800,363 and 4,738,004 are hereby incorporated herein by reference.

One of the problems not addressed in the above Lapeyre patents was the problem of supporting the transverse or lateral fish sections, when processing used a high speed, high pressure water jet cutting apparatus. Water jet knives typically employ a very high speed jet of pressurized water or like fluid which operates at a water pressure of up to 75,000 psi. When water jet cutters strike the transverse fish body section, there is a need to support the fish body section against the enormous force of the water jet knife, yet at the same time hold the lateral fish body section precisely so that error and waste are minimized. In short, the transverse fish body section must be precisely yet firmly supported during the cutting operation.

Another problem involves that portion of the water jet which travels downstream of the fish body section after the water jet passes through the fish body section removing a very small portion of the fish as the cutting progresses. The cut material and the high speed water would travel for many, many feet downstream of the target and would create a hazardous and messy condition if not controlled.

Yet another problem in processing fish relates to the video image which must be taken of the fish section. The knife must be precisely moved to cut the edible loin portions of the fish from the waste or lesser desirable portions thereof. A video image can be used but only the fish section needs to appear in the image. Any image other than the fish section causes confusion and error. In order to prevent the giving of false image information to the water jet knife, the fish body section must be photographed by a video camera and yet the support mechanism for the fish body section cannot interfere with that image created. When using a water jet knife, a high speed, high pressure water jet traverses the fish section. The water jet knife will desirably penetrate the fish section very quickly yet must continue downstream of the fish section unobstructed so that deflected water from the jet stream will not hit the fish section in an uncontrolled fashion that might move the fish section with respect to the knife destroying the precision of the operation and/or damaging the edible loin portion of the fish section during the process. The support mechanism for the fish body section must be precise, yet rugged, and preferably movable between the camera and water jet positions.

SUMMARY OF THE PRESENT INVENTION

The present invention solves these problems in a simple, straightforward yet precise and rugged manner. The present invention provides a photo-imaging apparatus for use in processing transverse fish body sections that includes a support frame, a video camera for providing imaging of a transverse fish body section to be processed when aimed at the transverse fish body section along a preselected line of sight. A fish section support is provided to support to the transverse fish section substantially over its entire area and has a section normal to the line of sight sufficiently small so that it does not appear on the video image of the fish body section. A water jet knife is relatively movable with respect to the transverse fish body section for cutting the section with a pressurized fluid stream and is positioned to traverse both the fish section and the support matrix. Although its method of supporting the transverse fish section could include other techniques such as a bed of pins or nails, or even vacuumized suction cups, the support matrix of one preferred embodiment includes multiple spaced apart beams, each extending transversely and substantially across the fish body section being processed. The fish body section being processed is therefore positioned between the imaging camera and the beams during processing. The beams are preferably non-parallel so that the fish section will not slide or move during the water jetting. Each blade is preferably made of stainless steel and has a sharp edge and a relatively thin thickness, but sufficient depth to provide stiffness and rigidity to withstand repeated blasts of the water jet knife over a long period of time. The fluid jetting knife is preferably a water jet knife. The apparatus further includes a dissipating receptacle positioned downstream of the fish body section from the knife for dissipating the pressurized fluid stream and any contained fish section cuttings. The dissipating receptacle preferably includes a rectangular receptacle having a bottom with side walls and an open top and containing a plurality of ball bearings (typically stainless steel) that are supported within the receptacle downstream of the transverse fish body section. In the preferred embodiment, the bottom of the dissipating receptacle also includes a suction drain to prevent the collection of any water. A screen is provided for viewing the photo-image generated by the imaging means both before and during cutting of the fish body section with the knife.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF A PREFERRED EMBODIMENT

FIGS. 1 through 4 show generally the preferred embodiment of the apparatus of the present invention designated generally by the numeral 10.

Figure 1:
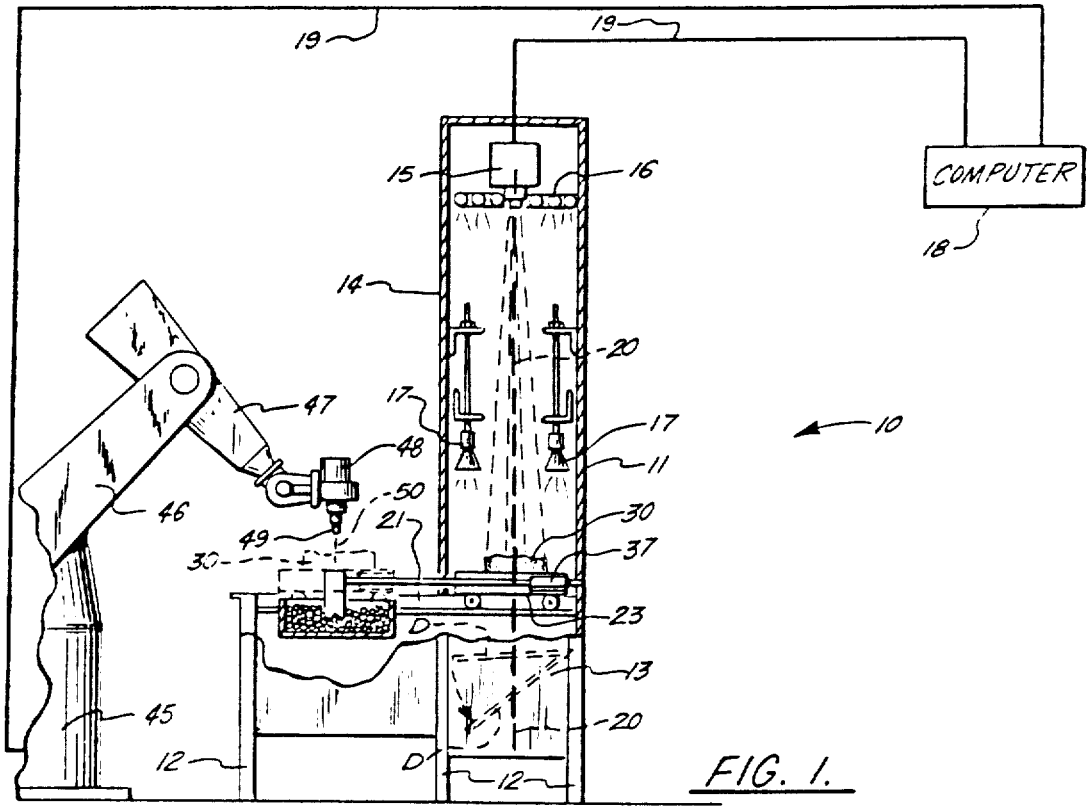
FIG. 1 is a side elevational view of the preferred embodiment of the apparatus of the present invention.

Apparatus 10 includes a frame 11 having a plurality of support legs 12 attached to a lower base portion 13. A superstructure enclosure 14 extends above base 13 and houses a video camera 15 which is used to produce a video image of a transverse fish body section to be processed when the video camera is aimed at the fish body section along a preselected line of sight. A plurality of photo flood lights including upper light array 16 and lower light array 17 are adjustably mounted within enclosure 14 to control the light intensity which illuminates a particular fish body section for video imaging of the fish body section. A dark colored pivotally mounted door can be used to shut out room light from the bottom of enclosure 14, and to provide an invisible background to the camera. The door would be pivotally mounted so that it could be easily cleaned. The door is shown in phantom lines in FIG. 1, designated by the letter "D." Computer 18 would have a computer program, for example, which interfaces the video image of a particular fish body section with a cutting apparatus, described hereinafter, so that the edible loin portions of the fish body sections are separated from the bloodmeat, viscera, and backbone portions thereof. Communication lines 19 as needed interface the video camera 15, water jet cutting apparatus 42, and computer 18. In FIG. 1, phantom lines 20 indicate generally the line of sight between camera 15 and the fish body section being processed.

Figure 2:
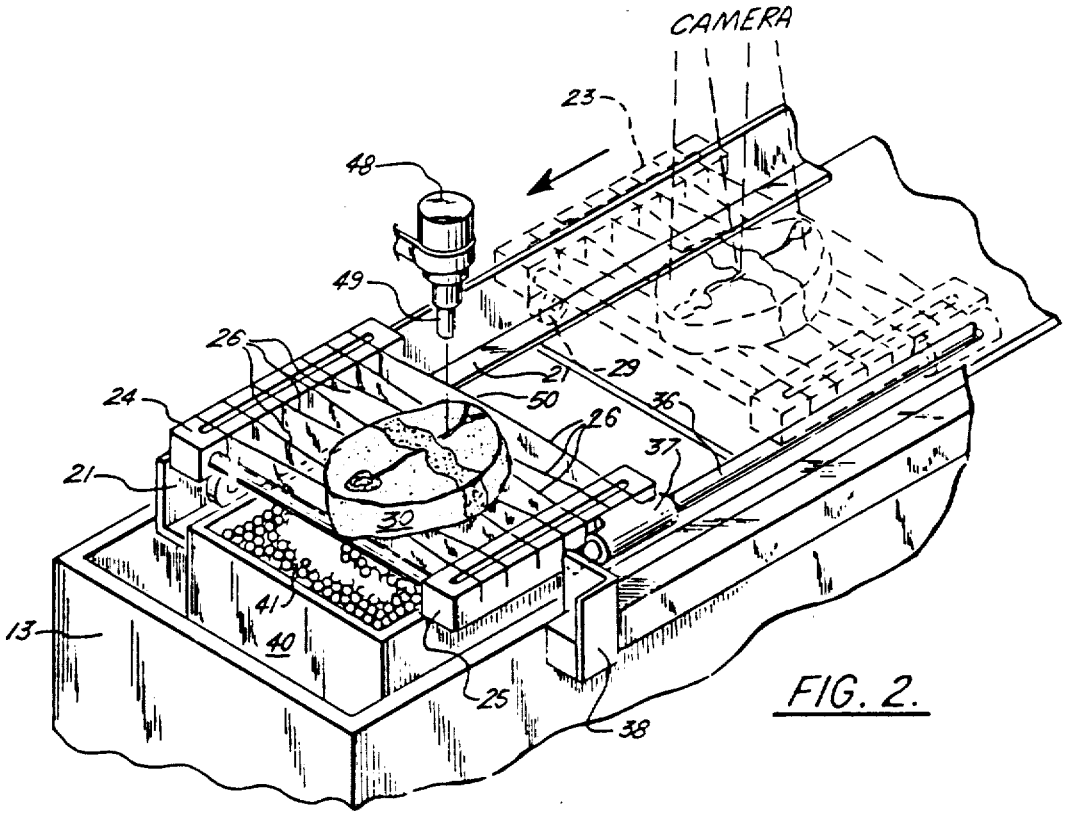
FIG. 2 is a partial perspective view of the preferred embodiment of the apparatus of the present invention.
Figure 3:
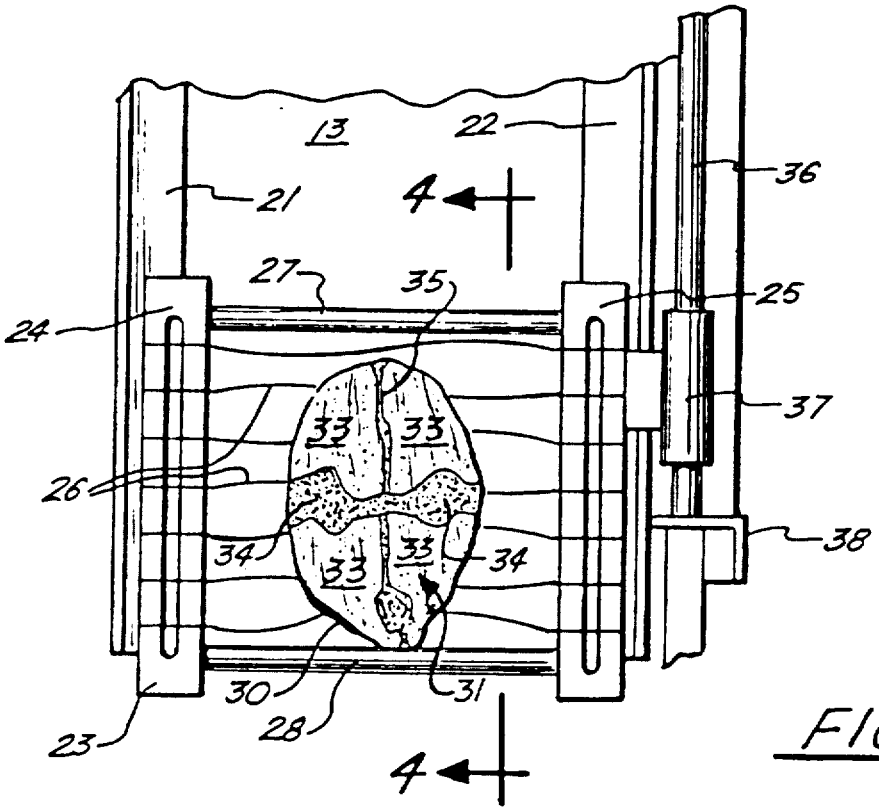
FIG. 3 is a partial plan view of the preferred embodiment of the apparatus of the present invention.
Figure 4:
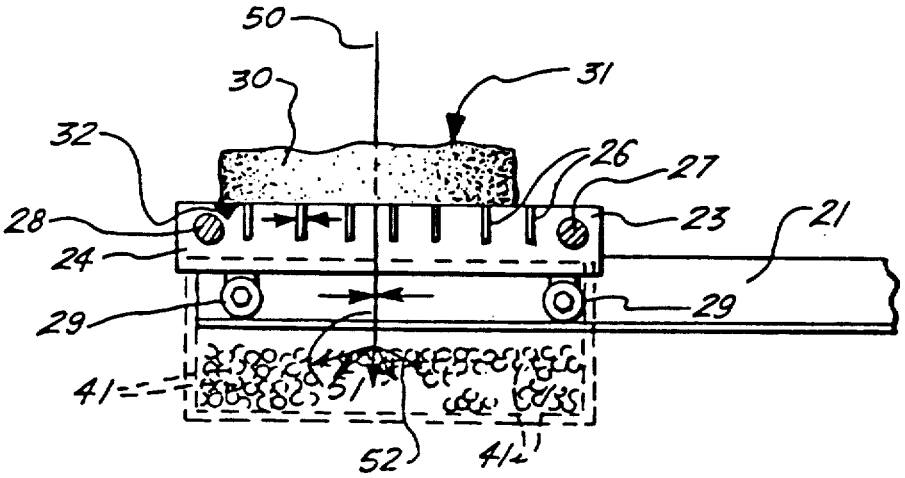
FIG. 4 is a partial sectional elevational view of the preferred embodiment of the apparatus of the present invention taken along lines 4—4 of FIG. 3.

The fish body section 30 to be processed is moved between two known positions including a first position under the video camera 15 and along the line of sight 20 (FIG. 1), and to a second position laterally removed from the line of sight 20 wherein the fish body section can be processed using a water jet knife (FIG. 2), as will be described more fully hereinafter. A runway in the form of a pair of spaced apart rails 21, 22 is provided upon base 13. A moving carriage 23, preferably wheeled or sliding, is mounted upon rails 21, 22. The carriage includes a pair of spaced apart main longitudinal carriage beams 24, 25, and a plurality of smaller, thin transverse knife edge beams 26. The transverse knife edge beams would preferably be non-parallel and of a slight "S" curved shape (FIGS. 2, 3) so that the fish body section will not slide or shift during the cutting operation. Additionally, transverse rods 27, 28 are provided for structurally transversely reinforcing carriage 23. In the embodiment shown, carriage 23 includes a plurality of wheels 29 so that it can move upon rails 21, 22, between the first position under camera 15 and along line of sight 20, and to the second position removed therefrom as shown in FIGS. 1, 2 and 4. The transverse fish body section to be processed is designated by the numeral 30 in the drawings. Fish body section 30 includes an upper surface 31, and a lower surface 32. The fish body section 30 would normally be processed to harvest four edible loin portions 33 and to separate therefrom the darker bloodmeat portion 34 and the backbone 35 portion.

Movement of carriage 23 between the known position of the video camera 15, and the water jet cutting apparatus 42 upon rails 21, 22 can be guided using guide bar 36 and fluid powered sleeve 37. A support 38 is provided for guide bar 36. A simple pneumatic piston and cylinder arrangement could be used to power carriage 23 upon rails 21, 22, or manual movement could be achieved by gripping sleeve 37 and moving it between the end portions of rails 21, 22 with stops 38, for example, being provided at the ends of guide bar 36, thus indexing the position of carriage 23 under camera 15 and line of sight 20 as well as under the water jet knife.

A receptacle 40 is positioned under transverse fish body section 30 at the cutting or processing position which is shown in hard lines in FIG. 2. Receptacle 40 includes a plurality of ball bearings 41 (typically stainless steel) and as shown in FIG. 4, a water jet stream 50 which passes through fish body section 30 would be dispersed into a plurality of smaller streams 52, thus preventing any danger of inadvertent redirecting or ricocheting of the stream 50. The water jet knife apparatus is designated generally the numeral 42 in FIG. 1 and includes a base 45 supporting a pair of robot arm sections 46, 47 with a water jet 48 having a lower nozzle 49 portion through which a small high pressurized stream 50 of water is shot. Water jet robot 42 is a commercially available cutting mechanism, and in the embodiment discussed, the transverse fish section is not allowed to move as the water jet moves about the section. However, it will be appreciated that the water jet knife could be rigidly maintained in a set position as the fish section is precisely moved under the water jet knife. Relative motion between the water jet knife and the fish section is required.

In operation, the carriage 23 would first be moved under the camera 15 in the position shown in FIG. 1 and under the line of sight 20. Fish body section 30 would then be viewed with the camera 15 producing an image. The image would contain the darker bloodmeat portion 34 (see FIG. 3) and the lighter loin portion 33, as well as the darker viscera cavity 39. In addition, although the backbone 35 is not typically visible, its location can be estimated. The computer could then be used to precisely control relevant movement between the water jet knife and the darker bloodmeat portions 34, the bone 35, and the viscera 39, thus leaving the edible loin 33 portions for packaging. The skin (not shown) could also be removed with the water jet knife or optionally could be removed in a manual procedure prior or subsequent to cutting with the water jet knife.

The foregoing description of the invention is illustrative and explanatory thereof, and various changes in the size, shape and materials, as well as in the details of the illustrated construction may be made without departing from the spirit of the invention.

What is claimed as invention is:

1. Processing apparatus for separating selected portions of a transverse fish body section comprising:

a visual station having a known location and further having a photo-imaging means for providing a visual image of said transverse fish body section when viewed along a preselected line of sight, said [imaging] *photo-imaging* means defining the selected portions of said fish body section;

a cutting station using a pressurized fluid stream for separating selected portions of said fish body section as defined by said photo-imaging means;

a plurality of means for supporting said transverse fish section substantially over its area, each of said [(means for supporting)] plurality being substantially invisible to said photo-imaging means and being suitable for receiving said pressurized fluid stream such that the fluid stream can [transverse] *traverse* the fish body section and said plurality of means for supporting without substantially altering the position of said fish section with respect to said means for [support] *supporting*, and further for moving from said known location of said visual station to a cutting station having another known location; and means for controlling the relative movement of the pressurized fluid stream with respect to the transverse fish body section.

2. The processing apparatus of claim 1 wherein said means for supporting comprises a carriage for moving on a runway between said [imaging] *visual* station and said cutting station.

3. The processing apparatus of claim 2 wherein said runway comprises a guide rail and said carriage includes a member for cooperating with said guide rail.

4. The processing apparatus of claim 1 wherein said means for supporting includes multiple spaced beams.

5. The processing apparatus of claim 1 wherein said selected portions of said fish body section defined by said [imaging] *photo-imaging* means [includes] *include* the loin and blood meat portions.

6. The processing apparatus of claim 5 wherein said selected portions of said fish body section defined by said [imaging] *photo-imaging means further* [includes] *includes* the skin.

7. The processing apparatus of claim 6 wherein said selected portions of said fish body section defined by said [imaging] *photo-imaging* means further [includes] *include* the bones.

8. The processing apparatus of claim 1 wherein said selected portions of said fish body section defined by said [imaging] *photo-imaging* means [includes] *include* the skin and loin portions.

9. The processing apparatus of claim 1 wherein said selected portions of said fish body section defined by said [imaging] *photo-imaging means further* [includes] *include* the bones and loin portions.

10. The processing apparatus of claim 1 wherein said selected portions of said fish body section defined by said [imaging] *photo-imaging means further* [includes] *include* the bones and blood meat portions.

*11. Processing apparatus for separating selected portions of a transverse fish body section comprising:*

*a visual station having a known location and further having a photo-imaging means for providing a visual image of said transverse fish body section when viewed along a preselected line of sight, said photo-imaging means defining the selected portions of said fish body section;*

*a cutting station using a pressurized fluid stream for separating selected portions of said fish body section as defined by said photo-imaging means;*

*means for supporting said transverse fish section substantially over its area, said means for supporting being suitable for receiving said pressurized fluid stream such that the fluid stream can cut the fish body section substantially over its area and also over the*

*area of said means for supporting and without substantially altering the position of said fish section with respect to said means for supporting;*

*transport means for moving from said known location of said visual station to a cutting station having another known location; and*

*means for controlling the relative movement of the pressurized fluid stream with respect to the transverse fish body section.*

*12. The processing apparatus of claim 11 wherein said means for supporting includes a carrier for moving on a runway between said visual station and said cutting station.*

*13. The processing apparatus of claim 11 wherein said selected portions of said fish body section defined by said photo-imaging means include the loin and blood meat portions.*

*14. The processing apparatus of claim 11 wherein said selected portions of said fish body section defined by said photo-imaging means further include the skin.*

*15. The processing apparatus of claim 11 wherein said selected portions of said fish body section defined by said photo-imaging means further include the bones.*

*16. Processing apparatus for separating selected portions of a transverse fish body section comprising:*

*a visual station having a photo-imaging means for providing a visual image of said transverse fish body section when viewed along a preselected line of sight, said photo-imaging means defining the selected portions of said fish body section;*

*a cutting station using a pressurized fluid stream for separating selected portions of said fish body section as defined by said photo-imaging means;*

*means for supporting said transverse fish section substantially over its area, said means for supporting being suitable for receiving said pressurized fluid stream such that the fluid stream can cut the fish body section substantially over its area and also over the area of said means for supporting and without substantially altering the position of said fish section with respect to said means for supporting;*

*means for moving the transverse fish section relative to said visual station and relative to the cutting station; and*

*means for controlling the relative movement of the pressurized fluid stream with respect to the transverse fish body section.*

*17. The processing apparatus of claim 16 wherein said means for supporting includes a carrier for moving on a runway between said visual station and said cutting station.*

*18. The processing apparatus of claim 16 wherein said selected portions of said fish body section defined by said photo-imaging means includes the loin and blood meat portions.*

*19. The processing apparatus of claim 16 wherein said selected portions of said fish body section defined by said photo-imaging means further include the skin.*

*20. The processing apparatus of claim 16 wherein said selected portions of said fish body section defined by said photo-imaging means further include the bones.*

* * * * *